United States Patent
Hirasawa et al.

(10) Patent No.: US 10,358,127 B2
(45) Date of Patent: Jul. 23, 2019

(54) HYBRID VEHICLE

(71) Applicants: TOYOTA JIDOSHA KABUSHIKI KAISHA, Toyota-shi, Aichi-ken (JP); DENSO CORPORATION, Kariya, Aichi-pref. (JP)

(72) Inventors: Takahiko Hirasawa, Toyota (JP); Shingo Takinai, Kariya (JP); Yutaka Koyama, Kariya (JP); Junmin Cao, Kariya (JP); Kengou Yamamoto, Kariya (JP)

(73) Assignees: Toyota Jidosha Kabushiki Kaisha, Toyota-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 4 days.

(21) Appl. No.: 15/671,516

(22) Filed: Aug. 8, 2017

(65) Prior Publication Data

US 2018/0043881 A1  Feb. 15, 2018

(30) Foreign Application Priority Data

Aug. 12, 2016  (JP) .................. 2016-158647

(51) Int. Cl.
*B60W 20/13* (2016.01)
*B60W 20/50* (2016.01)
(Continued)

(52) U.S. Cl.
CPC .............. *B60W 20/50* (2013.01); *B60K 6/442* (2013.01); *B60K 6/445* (2013.01); *B60K 6/52* (2013.01); *B60W 10/06* (2013.01); *B60W 10/08* (2013.01); *B60W 20/13* (2016.01); *B60W 20/20* (2013.01); *B60K 6/365* (2013.01);
(Continued)

(58) Field of Classification Search
CPC ...... B60W 20/20; B60W 20/13; B60W 10/06; B60W 10/08; B60K 6/442; B60K 6/52
See application file for complete search history.

(56) References Cited

U.S. PATENT DOCUMENTS 4,574,661 A * 3/1986 Opperud ......... B60W 30/18045
477/126
5,771,478 A * 6/1998 Tsukamoto ............ B60K 6/365
180/65.25
(Continued)

FOREIGN PATENT DOCUMENTS

| JP | 2011-235750 | 11/2011 |
| JP | 2014-184880 | 10/2014 |
| JP | 2015-154632 | 8/2015 |

*Primary Examiner* — Behrang Badii
*Assistant Examiner* — Daniel L Greene
(74) *Attorney, Agent, or Firm* — Finnegan, Henderson, Farabow, Garrett & Dunner, LLP

(57) ABSTRACT

There is provided a hybrid vehicle configured to control an engine, a first motor, a second motor and a third motor such as to be driven based on a required torque for driving. When the second motor is undrivable, the hybrid vehicle is configured to control the engine, the first motor and the third motor, such as to provide a higher state of charge of a battery than a state of charge of the battery provided when the second motor is drivable and such as to output a torque from the engine via a planetary gear to one pair of wheels accompanied with output of a torque from the first motor and output a torque from the third motor to the other pair of wheels.

7 Claims, 5 Drawing Sheets

(51) Int. Cl.
  *B60K 6/442* (2007.10)
  *B60K 6/52* (2007.10)
  *B60W 10/06* (2006.01)
  *B60W 10/08* (2006.01)
  *B60W 20/20* (2016.01)
  *B60K 6/445* (2007.10)
  *B60K 6/365* (2007.10)

(52) U.S. Cl.
  CPC ........... *B60W 2510/244* (2013.01); *B60W 2710/0666* (2013.01); *B60W 2710/083* (2013.01); *B60Y 2200/92* (2013.01); *Y02T 10/6234* (2013.01); *Y02T 10/6239* (2013.01); *Y02T 10/6265* (2013.01); *Y02T 10/6286* (2013.01); *Y02T 10/7258* (2013.01); *Y10S 903/93* (2013.01)

(56) References Cited

U.S. PATENT DOCUMENTS

| | | | | |
|---|---|---|---|---|
| 5,806,617 A * | 9/1998 | Yamaguchi | B60K 6/365 | 180/65.235 |
| 5,818,116 A * | 10/1998 | Nakae | B60W 10/06 | 290/38 R |
| 5,988,307 A * | 11/1999 | Yamada | B60K 6/26 | 180/243 |
| 6,459,980 B1 * | 10/2002 | Tabata | B60K 6/46 | 701/70 |
| 6,886,648 B1 * | 5/2005 | Hata | B60K 6/387 | 180/65.235 |
| 2001/0020789 A1 * | 9/2001 | Nakashima | B60K 6/365 | 290/40 C |
| 2001/0048226 A1 * | 12/2001 | Nada | F02N 11/0859 | 290/40 C |
| 2004/0060535 A1 * | 4/2004 | Osawa | B60K 6/445 | 123/198 DB |
| 2005/0184529 A1 * | 8/2005 | Ueda | B60K 6/365 | 290/400 |
| 2005/0262827 A1 * | 12/2005 | Ichimoto | B60K 6/365 | 60/277 |
| 2006/0108166 A1 * | 5/2006 | Tanaka | B60K 6/445 | 180/248 |
| 2006/0113129 A1 * | 6/2006 | Tabata | B60K 6/365 | 180/65.25 |
| 2007/0235006 A1 * | 10/2007 | Nishigaki | F02D 31/003 | 123/339.1 |
| 2008/0004780 A1 * | 1/2008 | Watanabe | B60K 6/40 | 701/54 |
| 2008/0269010 A1 * | 10/2008 | Matsubara | B60L 50/16 | 477/5 |
| 2009/0029825 A1 * | 1/2009 | Matsubara | B60W 20/13 | 477/35 |
| 2009/0105924 A1 * | 4/2009 | Kamichi | B60K 6/40 | 701/99 |
| 2009/0305832 A1 * | 12/2009 | Matsubara | B60K 6/445 | 475/150 |
| 2010/0004089 A1 * | 1/2010 | Iwase | B60W 20/15 | 477/3 |
| 2010/0151988 A1 * | 6/2010 | Tabata | B60K 6/442 | 477/3 |
| 2010/0175944 A1 * | 7/2010 | Hayashi | B60K 6/445 | 180/242 |
| 2010/0298092 A1 * | 11/2010 | Tsuchikawa | B60K 6/365 | 477/71 |
| 2011/0054727 A1 * | 3/2011 | Ebuchi | B60W 20/10 | 701/22 |
| 2011/0109179 A1 * | 5/2011 | Akutsu | B60W 10/04 | 310/77 |
| 2016/0272189 A1 * | 9/2016 | Inoue | B60W 10/06 | |
| 2016/0318505 A1 * | 11/2016 | Aoki | B60W 20/20 | |
| 2017/0113679 A1 * | 4/2017 | Hata | B60K 6/387 | |

* cited by examiner

HYBRID VEHICLE

CROSS-REFERENCE TO RELATED APPLICATION

The present disclosure claims priority to Japanese Patent Application No. 2016-158647 filed Aug. 12, 2016, which is incorporated herein by reference in its entirety including specification, drawings and claims.

TECHNICAL FIELD

The present disclosure relates to a hybrid vehicle.

BACKGROUND

A prior art hybrid vehicle has been proposed to have such a configuration that an engine, a first motor and a driveshaft coupled with drive wheels are respectively connected with a carrier, a sun gear and a ring gear of a planetary gear, that a second motor is connected with the driveshaft and that the first motor and the second motor transmit electric power to and from a battery (as described in, for example, JP 2011-235750A). When the second motor is undrivable, this hybrid vehicle is configured to control the engine and the first motor such as to keep the rotation speed of the first motor at a predetermined rotation speed and such as to output a torque that allows the vehicle to be driven, from the engine via the planetary gear to the driveshaft.

CITATION LIST

Patent Literature

PTL 1: JP 2011-235750A

SUMMARY

When the second motor is undrivable, the above prior art hybrid vehicle is likely to fail to sufficiently respond to a relatively large required torque that is required for driving.

The hybrid vehicle of the disclosure thus mainly aims to be driven with a larger torque when the second motor is undrivable.

In order to achieve the above object, the hybrid vehicle of the disclosure is implemented by an aspect described below.

The present disclosure is directed to a hybrid vehicle. The hybrid vehicle including an engine, a first motor, a planetary gear configured to include three rotational elements that are respectively connected with one pair of wheels between front wheels and rear wheels, the engine and the first motor, such that the first motor, the engine and the one pair of wheels are arrayed in this sequence in a collinear diagram, a second motor connected with the one pair of wheels, a third motor connected with the other pair of wheels between the front wheels and the rear wheels; a battery configured to transmit electric power to and from the first motor, the second motor and the third motor, and a control device configured to control the engine, the first motor, the second motor and the third motor such that the hybrid vehicle is driven based on a required torque for driving. When the second motor is undrivable, the control device is configured to control the engine, the first motor and the third motor, such as to provide a higher state of charge of the battery than a state of charge of the battery provided when the second motor is drivable and such as to output a torque from the engine via the planetary gear to the one pair of wheels accompanied with output of a torque from the first motor and output a torque from the third motor to the other pair of wheels.

When the second motor is undrivable, the hybrid vehicle of this aspect is configured to control the engine, the first motor and the third motor, such as to provide the higher state of charge of the battery than the state of charge of the battery provided when the second motor is drivable and such as to output a torque from the engine via the planetary gear to one pair of wheels accompanied with output of a torque from the first motor and output a torque from the third motor to the other pair of wheels. When the second motor is undrivable, the hybrid vehicle of this aspect is configured to be driven with the torque output from the engine via the planetary gear to one pair of wheels accompanied with output of the torque from the first motor (hereinafter called "directly transmitted torque of the engine") and with the torque output from the third motor to the other pair of wheels. This configuration enables the hybrid vehicle to be driven with the larger torque, compared with a configuration that causes the hybrid vehicle to be driven with only the directly transmitted torque of the engine (for example, a configuration that is not equipped with the third motor or a configuration that is equipped with the third motor but stops driving of the third motor). Additionally, when the second motor is undrivable, the hybrid vehicle of this aspect is configured to provide the higher state of charge of the battery than the state of charge of the battery provided when the second motor is drivable. This configuration more sufficiently provides an electric power required for driving the third motor.

DESCRIPTION OF EMBODIMENTS

The following describes aspects of the disclosure with reference to some embodiments.

Figure 1:
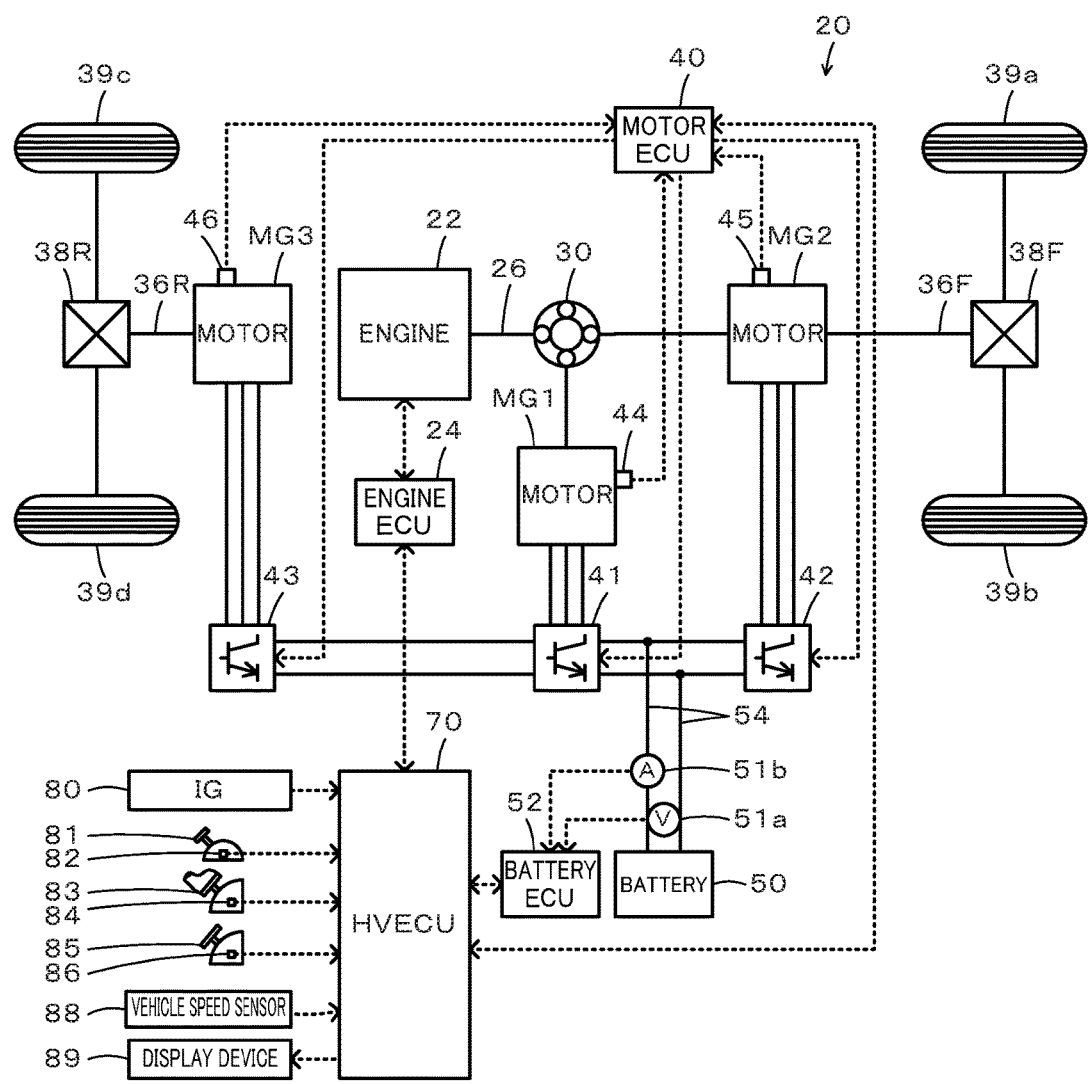
FIG. 1 is a configuration diagram illustrating the schematic configuration of a hybrid vehicle according to an embodiment of the disclosure.

FIG. 1 is a configuration diagram illustrating the schematic configuration of a hybrid vehicle 20 according to an embodiment of the disclosure. As illustrated, the hybrid vehicle 20 of the embodiment includes an engine 22, a planetary gear 30, motors MG1, MG2 and MG3, inverters 41, 42 and 43, a battery 50 and a hybrid electronic control unit (hereinafter referred to as "HVECU") 70.

The engine 22 is configured as an internal combustion engine that output power using, for example, gasoline or light oil as fuel. This engine 22 is operated and controlled by an engine electronic control unit (hereinafter referred to as engine ECU) 24.

The engine ECU 24 is configured as a CPU-based microprocessor and includes a ROM configured to store processing programs, a RAM configured to temporarily store data, input/output ports and a communication port, in addition to the CPU, although not being illustrated. The engine ECU 24 receives signals input from various sensors required for operation control of the engine 22 via the input port, for example, a crank angle θcr from a crank position sensor configured to detect the rotational position of a crankshaft 26 of the engine 22. The engine ECU 24 outputs various control signals for the operation control of the engine 22 via the output port. The engine ECU is connected with the HVECU 70 via the respective communication ports. The engine ECU 24 calculates a rotation speed Ne of the engine 22, based on the crank angle θcr input from the crank position sensor.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36F which is coupled with front wheels 39a and 39b via a differential gear 38F. The planetary gear 30 further includes a carrier that is connected with the crankshaft 26 of the engine 22. Accordingly the motor MG1, the engine 22 and the driveshaft 36F are connected with the sun gear, the carrier and the ring gear as three rotational elements of the planetary gear 30 such as to be arrayed in this sequence in a collinear diagram of the planetary gear 30.

The motor MG1 may be configured as, for example, a synchronous motor generator and has the rotor that is connected with the sun gear of the planetary gear 30 as described above. The motor MG2 may be configured as, for example, a synchronous motor generator and has a rotor that is connected with the driveshaft 36F. The motor MG3 may be configured as, for example, a synchronous motor generator and has a rotor that is connected with a driveshaft 36R which is coupled with rear wheels 39c and 39d via a differential gear 38R. The inverter 41, the inverter 42 and the inverter 43 are respectively connected with the motor MG1, the motor MG2 and the motor MG3 and are all connected with the battery 50 via power lines 54. The motor MG1, the motor MG2 and the motor MG3 are driven and rotated by switching control of a plurality of switching elements (not shown) included in the respective inverters 41, 42 and 43 by a motor electronic control unit (hereinafter referred to as "motor ECU") 40.

The motor ECU 40 is configured as a CPU-based microprocessor and includes a ROM configured to store processing programs, a RAM configured to temporarily store data, input/output ports and a communication port, in addition to the CPU, although not being illustrated. The motor ECU 40 receives signals input from various sensors required for drive control of the motors MG1, MG2, and MG3 via the input port, for example, rotational positions θm1, θm2 and θm3 from rotational position detection sensors 44, 45 and 46 respectively configured to detect the rotational positions of the respective rotors of the motors MG1, MG2 and MG3. The motor ECU 40 outputs, for example, switching control signals to the plurality of switching elements (not shown) included in the respective inverters 41, 42 and 43 via the output port. The motor ECU 40 is connected with the HVECU 70 via the respective communication ports. The motor ECU 40 calculates rotation speeds Nm1, Nm2 and Nm3 of the respective motors MG1, MG2 and MG3, based on the rotational positions θm1, θm2 and θm3 of the respective rotors of the motors MG1, MG2 and MG3 input from the rotational position detection sensors 44, 45 and 46.

The battery 50 may be configured by, for example, a lithium ion rechargeable battery or a nickel metal hydride battery and is connected with the inverters 41, 42 and 43 via the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports and a communication port, in addition to the CPU, although not being illustrated. The battery ECU 52 receives signals input from various sensors required for management of the battery 50 via the input port. The signals input into the battery ECU 52 include, for example, a voltage Vb of the battery 50 from a voltage sensor 51a placed between terminals of the battery 50 and an electric current (charge-discharge current) Ib of the battery 50 from a current sensor 51b mounted to an output terminal of the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The state of charge SOC denotes a ratio of the capacity of electric power dischargeable from the battery 50 to the overall capacity of the battery 50.

The HVECU 70 is configured as a CPU-based microprocessor and includes a ROM configured to store processing programs, a RAM configured to temporarily store data, input/output ports and a communication port, in addition to the CPU, although not being illustrated. The HVECU 70 receives signals input from various sensors via the input port. The signals input into the HVECU 70 include, for example, an ignition signal from an ignition switch 80 and a shift position SP from a shift position sensor 82 configured to detect an operating position of a shift lever 81. The input signals further include, for example, an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 outputs, for example, a display control signal to a display device 89 configured to display information, via the output port. The HVECU 70 is connected with the engine ECU 24, the motor ECU 40 and the battery ECU 52 via the respective communication ports as described above.

The hybrid vehicle 20 of the embodiment having the configuration described above is driven in a plurality of different drive modes including an electric drive (EV drive) mode in which the hybrid vehicle 20 is driven without operation of the engine 22 and a hybrid drive (HV drive) mode in which the hybrid vehicle 20 is driven with operation of the engine 22.

In the EV drive mode, the hybrid vehicle 20 is basically driven as described below. The HVECU 70 first sets a required torque Td* that is required for driving, based on the accelerator position Acc and the vehicle speed V. The HVECU 70 subsequently sets a value "0" to a torque command Tm1* of the motor MG1, and sets torque commands Tm2* and Tm3* of the motors MG2 and MG3 such that the required torque Td* is output to the front wheels 39a and 39b and to the rear wheels 39c and 39d at a torque distribution ratio kt within allowable driving ranges of the motors MG2 and MG3. The torque distribution ratio kt herein denotes a ratio of the torque to be output to the rear wheels 39c and 39d to the sum of the torque to be output to the front wheels 39a and 39b and the torque to be output to the rear wheels 39c and 39d. Basically, a product (Td*·(1−kt)) of the required torque Td* and a value obtained by subtracting the torque distribution ratio kt from a value 1 is set to the torque command Tm2* of the motor MG2. A product (Td*·kt) of the required torque Td* and the torque distribution ratio kt is set to the torque command Tm3* of the motor MG3. The HVECU 70 then sends the set torque commands Tm1*, Tm2* and Tm3* of the motors MG1, MG2 and MG3 to the motor ECU 40. The motor ECU 40 performs switching control of the plurality of switching elements included in the respective inverters 41, 42 and 43 such as to drive the motors MG1, MG2 and MG3 with the torque commands Tm1*, Tm2* and Tm3*.

In the HV drive mode, the hybrid vehicle 20 is basically driven as described below. The HVECU 70 first sets a required torque Td* that is required for driving, based on the accelerator position Acc and the vehicle speed V, and sets a required power Pd* that is required for driving, based on the set required torque Td* and the vehicle speed V. The HVECU 70 subsequently sets a predetermined value S1 (for example, 45%, 50% or 55%) to a target state of charge SOC* of the battery 50, and sets a required charge-discharge power Pb* of the battery (which takes a positive value when the battery 50 is discharged) such that the state of charge SOC of the battery 50 approaches the target state of charge SOC*. The HVECU 70 then calculates a required power Pe* that is required for the vehicle (i.e., required for the engine 22) by subtracting the required charge-discharge power Pb* from the required power Pd*. After setting the required power Pe*, the HVECU 70 sets a target rotation speed Ne* and a target torque Te* of the engine 22 and torque commands Tm1*, Tm2* and Tm3* of the respective motors MG1, MG2 and MG3, such that the required power Pe* is output from the engine 22 and the required torque Td* is output to the front wheels 39a and 39b and to the rear wheels 39c and 39d at the torque distribution ratio kt within allowable driving ranges of the engine 22 and the motors MG1, MG2 and MG3. Basically, values based on the required power Pe* and an operation line (for example, a fuel consumption operation line) that allows the engine 22 to be operated with high efficiency are set to the target rotation speed Ne* and the target torque Te* of the engine 22. A value determined by rotation speed feedback control such as to rotate the engine 22 at the target rotation speed Ne* is set to the torque command Tm1* of the motor MG1. The torque command Tm1* of the motor MG1 provides a torque in a direction of reducing the rotation speed Ne of the engine 22. The motor MG1 is thus regeneratively driven (to serve as a generator) when the rotation speed Nm1 of the motor MG1 provides a positive value (i.e., when the motor MG1 is rotated in the same direction as the engine 22). A value (Td*·(1−kt)−Ted) calculated by subtracting a directly transmitted torque Ted of the engine 22 from the product (Td*·(1−kt)) of the required torque Td* and the value obtained by subtracting the torque distribution ratio kt from the value 1 is set to the torque command Tm2* of the motor MG2. The directly transmitted torque Ted denotes a torque output from the engine 22 to the front wheels 39a and 39b via the planetary gear 30, accompanied with output of the torque from the motor MG1 in the direction of reducing the rotation speed Ne of the engine 22. The product (Td*·kt) of the required torque Td* and the torque distribution ratio kt is set to the torque command Tm3* of the motor MG3. The HVECU 70 then sends the target rotation speed Ne* and the target torque Te* of the engine 22 to the engine ECU 24, while sending the torque commands Tm1*, Tm2* and Tm3* of the motors MG1, MG2 and MG3 to the motor ECU 40. The engine ECU 24 performs intake air flow control, fuel injection control and ignition control of the engine 22 such as to operate the engine 22 with the target rotation speed Ne* and the target torque Te*. The motor ECU 40 performs switching control of the plurality of switching elements included in the respective inverters 41, 42 and 43 such as to drive the motors MG1, MG2 and MG3 with the torque commands Tm1*, Tm2* and Tm3*.

Figure 2:
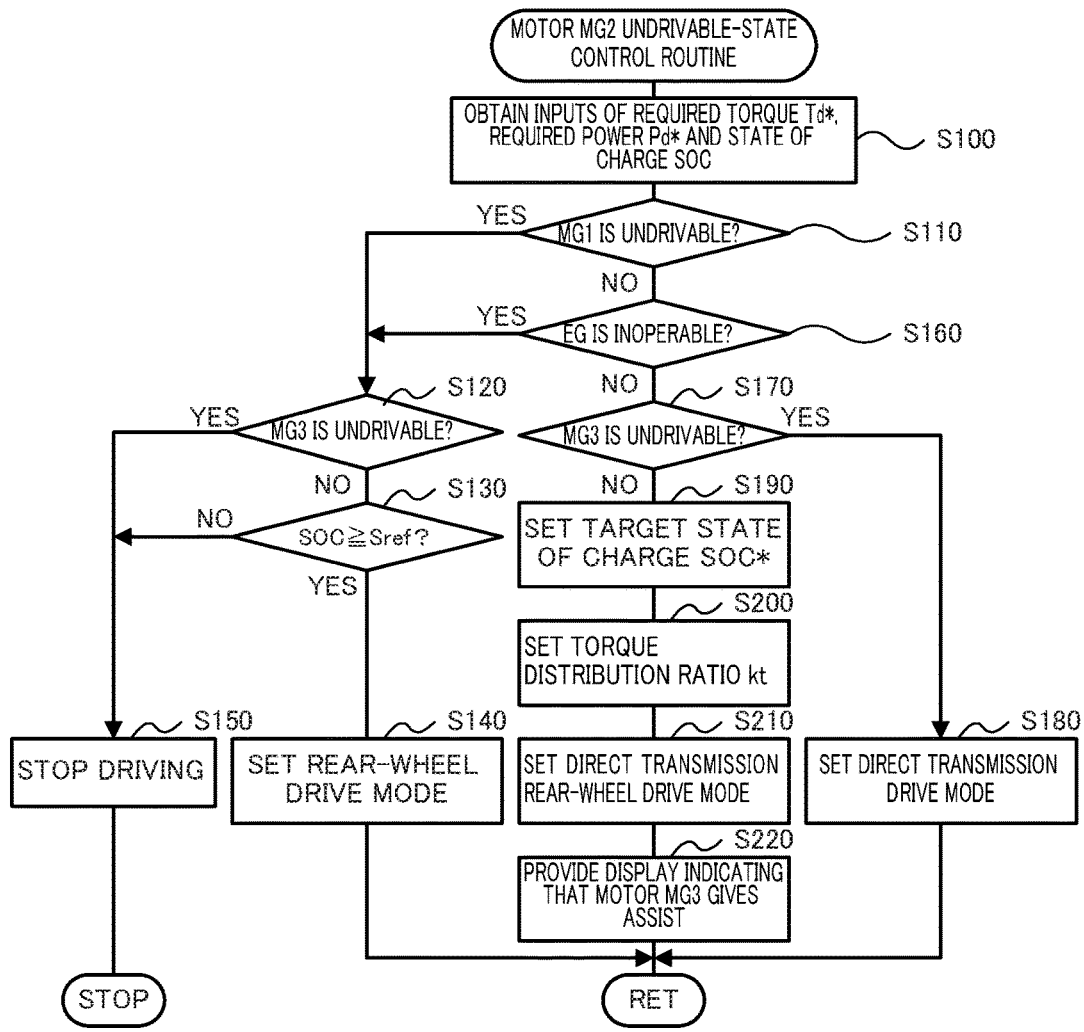
FIG. 2 is a flowchart showing an example of a motor MG2 undrivable-state control routine performed by an HVECU according to the embodiment.

The following describes operations of the hybrid vehicle 20 of the embodiment having the above configuration or more specifically series of operations when the motor MG2 is undrivable. The motor MG2 is undrivable, for example, when the temperature of the motor MG2 or the temperature of the inverter 42 exceeds an allowable upper limit temperature or when no rotational position θm2 of the rotor of the motor MG2 has been input from the rotational position detection sensor 45 into the motor ECU 40 for a predetermined time period. FIG. 2 is a flowchart showing an example of a motor MG2 undrivable-state control routine performed by the HVECU 70 according to the embodiment. This routine is performed repeatedly when the hybrid vehicle 20 is driven in the state that the motor MG2 is undrivable.

When the motor MG2 undrivable-state control routine is triggered, the HVECU 70 first obtains input data, for example, the required torque Td*, the required power Pd* and the state of charge SOC of the battery 50 (step S100). The required torque Td* and the required power Pd* input here are the required torque Td* and the required power Pd* set in the same manner as those in the ordinary state (i.e., in the state that all the engine 22 and the motors MG1, MG2 and MG3 are drivable). The state of charge SOC of the battery 50 input here is the state of charge SOC calculated by the battery ECU 52.

After obtaining the input data, the HVECU 70 determines whether the motor MG1 is undrivable (step S110). It is determined that the motor MG1 is undrivable, for example, when the temperature of the motor MG1 or the temperature of the inverter 41 exceeds an allowable upper limit temperature or when no rotational position θm1 of the rotor of the motor MG1 has been input from the rotational position detection sensor 44 into the motor ECU 40 for a predetermined time period.

When it is determined at step S110 that the motor MG1 is undrivable, the HVECU 70 subsequently determines whether the motor MG3 is undrivable (step S120). It is determined that the motor MG3 is undrivable, for example, when the temperature of the motor MG3 or the temperature of the inverter 43 exceeds an allowable upper limit temperature or when no rotational position θm3 of the rotor of the motor MG3 has been input from the rotational position detection sensor 46 into the motor ECU 40 for a predetermined time period. When determining that the motor MG3 is undrivable, the HVECU 70 reduces the speed of the hybrid vehicle 20 by inertia driving or by operation of a hydraulic brake device (not shown) in response to the driver's braking operation to stop driving of the hybrid vehicle 20 (step S150) and terminates this routine.

When it is determined at step S120 that the motor MG3 is drivable, on the other hand, the HVECU 70 compares the state of charge SOC of the battery 50 with a reference value Sref (step S130). The reference value Sref is determined as an allowable lower limit state of charge of the battery 50 and may be, for example, 30%, 35% or 40%.

When it is determined at step S130 that the state of charge SOC of the battery 50 is equal to or higher than the reference value Sref, the HVECU 70 sets a rear-wheel drive mode in which the hybrid vehicle 20 is driven with only the torque output from the motor MG3 (step S140) and terminates this routine. In the rear-wheel drive mode, the HVECU 70 sets the torque command Tm3* of the motor MG3 such as to output the required torque Td* to the rear wheels 39c and 39d within the allowable driving range of the motor MG3 and sends the set torque command Tm3* of the motor MG3 to the motor ECU 40. Basically, the required torque Td* is set to the torque command Tm3* of the motor MG3. The motor ECU 40 controls the inverter 43 such as to drive the motor MG3 with the torque command Tm3*.

When it is determined at step S130 that the state of charge SOC of the battery 50 is lower than the reference value Sref, on the other hand, the HVECU 70 reduces the speed of the hybrid vehicle 20 by inertia driving or by operation of the hydraulic brake device (not shown) in response to the driver's braking operation to stop driving of the hybrid vehicle 20 (step S150) and terminates this routine. This suppresses the state of charge SOC of the battery 50 from falling into an over-discharged state.

When it is determined at step S110 that the motor MG1 is drivable, on the other hand, the HVECU 70 subsequently determines whether the engine 22 is inoperable (step S160). It is determined that the engine 22 is inoperable, for example, when the temperature of the engine 22 exceeds an allowable upper limit temperature or when no signals have been input from the various sensors required for the operation control of the engine 22 into the engine ECU 24 for a predetermined time period. When it is determined that the engine 22 is inoperable, the HVECU 70 performs the processing of and after step S120 as described above.

When it is determined at step S160 that the engine 22 is operable, on the other hand, the HVECU 70 subsequently determines whether the motor MG3 is undrivable (step S170), like the determination of step S120. When it is determined that the motor MG3 is undrivable, the HVECU 70 sets a direct transmission drive mode in which the hybrid vehicle 20 is driven with only the directly transmitted torque Ted of the engine 22 (step S180) and terminates this routine.

In the direct transmission drive mode, the HVECU 70 sets the target rotation speed Ne* and the target torque Te* of the engine 22 and the torque command Tm1* of the motor MG1 such as to output the required torque Td* to the front wheels 39a and 39b within the allowable driving ranges of the engine 22 and the motor MG1, and sends the set target rotation speed Ne* and the set target torque Te* to the engine ECU 24, while sending the set torque command Tm1* of the motor MG1 to the motor ECU 40. Basically, a value obtained by converting the required torque Td* into a torque of the crankshaft 26 of the engine 22 is set to the target torque Te* of the engine 22. A value obtained by dividing the required power Pd* by the target torque Te* is set to the target rotation speed Ne* of the engine 22. A value calculated in the same manner as that in the ordinary state (i.e., in the state that all the engine 22 and the motors MG1, MG2 and MG3 are drivable) is set to the torque command Tm1* of the motor MG1. The engine ECU 24 controls the engine 22 such as to operate the engine 22 with the target rotation speed Ne* and the target torque Te*. The motor ECU 40 controls the inverter 41 such as to drive the motor MG1 with the torque command Tm1*.

Figure 3:
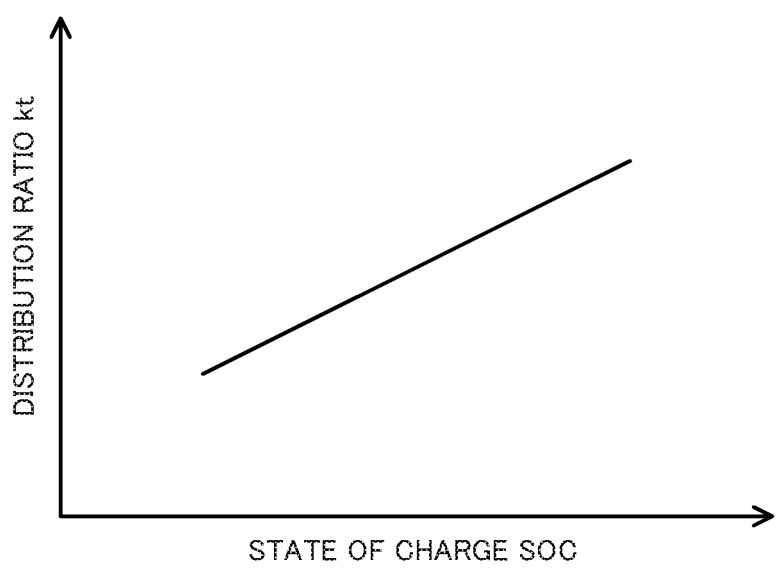
FIG. 3 is a diagram illustrating one example of a torque distribution ratio setting map.

When it is determined at step S170 that the motor MG3 is drivable, on the other hand, the HVECU 70 sets a predetermined value S2 (for example, 60%, 65% or 70%) that is higher than the predetermined value S1 in the ordinary state (i.e., in the state that all the engine 22 and the motors MG1, MG2 and MG3 are drivable in the HV drive mode) to the target state of charge SOC* of the battery 50 (step S190), and sets the torque distribution ratio kt, based on the state of charge SOC of the battery 50 (step S200). According to this embodiment, a relationship between the state of charge SOC of the battery 50 and the torque distribution ratio kt is determined in advance and is stored as a torque distribution ratio setting map in the ROM (not shown). When the state of charge SOC of the battery 50 is given, the HVECU 70 leads out the torque distribution ratio kt corresponding to the given state of charge SOC from the map and sets the read-out torque distribution ratio kt. One example of the torque distribution ratio setting map is shown in FIG. 3. As illustrated, the torque distribution ratio kt is set to provide a higher value at the higher state of charge SOC of the battery 50 than the value at the lower state of charge SOC of the battery 50 or more specifically to increase with an increase in the state of charge SOC of the battery 50. The reason of such setting will be described later.

The HVECU 70 subsequently sets a direct transmission rear-wheel drive mode in which the hybrid vehicle 20 is driven with the directly transmitted torque Ted of the engine 22 and the torque output from the motor MG3 (step S210), provides a display indicating that the motor MG3 gives an assist to the directly transmitted torque Ted of the engine 22 (i.e., indicating that the motor MG3 is driven), on the display device 89 (step S220) and terminates this routine.

In the direct transmission rear-wheel drive mode, the HVECU 70 sets the required charge-discharge power Pb* of the battery 50 such that the state of charge SOC of the battery 50 approaches the target state of charge SOC* (i.e., the predetermined value S2), and calculates the required power Pe* by subtracting the required charge-discharge power Pb* of the battery 50 from the required power Pd*. The HVECU 70 subsequently sets the target rotation speed Ne* and the target torque Te* of the engine 22 and the torque commands Tm1* and Tm3* of the motors MG1 and MG3, such as to output the required power Pe* from the engine 22 and to output the required torque Td* to the front wheels 39a and 39b and to the rear wheels 39c and 39d at the torque distribution ratio kt within the allowable driving ranges of the engine 22 and the motors MG1 and MG2. Basically, a value obtained by converting the product (Td*·(1−kt)) of the required torque Td* and the value obtained by subtracting the torque distribution ratio kt from the value 1 into a torque of the crankshaft 26 of the engine 22 is set to the target torque Te* of the engine 22. A value obtained by dividing the required power Pe* by the target torque Te* is set to the target rotation speed Ne* of the engine 22. The value calculated in the same manner as that in the ordinary state (i.e., in the state that all the engine 22 and the motors MG1, MG2 and MG3 are drivable) is set to the torque command Tm1* of the motor MG1. The product (Td*·kt) of the required torque Td* and the torque distribution ratio kt is set to the torque command Tm3* of the motor MG3. The HVECU 70 then sends the set target rotation speed Ne* and the set target torque Te* to the engine ECU 24, while sending the set torque commands Tm1* and Tm3* of the motors MG1 and MG3 to the motor ECU 40. The engine ECU 24 controls the engine 22 such as to operate the engine 22 with the target rotation speed Ne* and the target torque Te*. The motor ECU 40 controls the inverters 41 and 43 such as to drive the motors MG1 and MG3 with the torque commands Tm1* and Tm3*.

As described above, when the motor MG2 is undrivable, the hybrid vehicle 20 is configured to be driven with the directly transmitted torque Ted of the engine 22 and the torque output from the motor MG3. This configuration enables the hybrid vehicle 20 to be driven with the larger torque, compared with a configuration that causes the hybrid vehicle to be driven with only the directly transmitted torque Ted of the engine 22 (for example, a configuration that is not equipped with the motor MG3 or a configuration that is equipped with the motor MG3 but stops driving of the motor MG3). The hybrid vehicle 20 is also configured to provide the higher target state of charge SOC* of the battery 50 in the state that the motor MG2 is undrivable, compared with the target state of charge SOC* set in the ordinary state (i.e., in the state that all the engine 22 and the motors MG1, MG2 and MG3 are drivable). This configuration more sufficiently provides an electric power required for driving the motor MG3. Additionally, the torque distribution ratio kt is set to provide a higher value at the higher state of charge SOC of the battery 50 than the value at the lower state of charge SOC of the battery 50. When the battery 50 has the high state of charge SOC, this configuration increases the power consumption of the motor MG3 and suppresses the battery 50 from being overcharged. When the battery 50 has the low state of charge SOC, this configuration decreases the power consumption of the motor MG3 and suppresses the battery 50 from being over-discharged. Furthermore, the hybrid vehicle 20 is configured to provide the display indicating that the motor MG3 gives an assist to the directly transmitted torque Ted of the engine 22 (i.e., indicating that the motor MG3 is driven), on the display device 89. This configuration enables the driver to be notified of and recognize the situation.

When the motor MG2 is undrivable but the engine 22 is operable and the motors MG1 and MG3 are drivable, the hybrid vehicle 20 of the embodiment described above controls the engine 22 and the motors MG1 and MG3 such as to be driven with the torque output from the engine 22 via the planetary gear 30 to the front wheels 39a and 39b accompanied with output of the torque from the motor MG1 (i.e., the directly transmitted torque Ted of the engine 22) and with the torque output from the motor MG3 to the rear wheels 39c and 39d. This configuration enables the hybrid vehicle 20 to be driven with the larger torque, compared with the configuration that causes the hybrid vehicle to be driven with only the directly transmitted torque Ted of the engine 22. The hybrid vehicle 20 is also configured to provide the higher target state of charge SOC* of the battery 50 in the state that the motor MG2 is undrivable, compared with the target state of charge SOC* set in the ordinary state (i.e., in the state that all the engine 22 and the motors MG1, MG2 and MG3 are drivable). This configuration more sufficiently provides an electric power required for driving the motor MG3.

Additionally, when the motor MG2 is undrivable but the engine 22 is operable and the motors MG1 and MG3 are drivable, the hybrid vehicle 20 of the embodiment provides a higher torque distribution ratio kt at the higher state of charge SOC of the battery 50 than the value at the lower state of charge SOC of the battery 50. When the battery 50 has the high state of charge SOC, this configuration increases the power consumption of the motor MG3 and suppresses the battery 50 from being overcharged. When the battery 50 has the low state of charge SOC, this configuration decreases the power consumption of the motor MG3 and suppresses the battery 50 from being over-discharged.

When the motor MG2 is undrivable but the engine 22 is operable and the motors MG1 and MG3 are drivable, the hybrid vehicle 20 of the embodiment provides a higher torque distribution ratio kt at the higher state of charge SOC of the battery 50 than the value at the lower state of charge SOC of the battery 50. According to a modification, a fixed torque distribution ratio kt may be used.

When the direct transmission rear-wheel drive mode is set (to drive the hybrid vehicle 20 with the directly transmitted torque Ted of the engine 22 and the torque output from the motor MG3) in the state that the motor MG2 is undrivable, the hybrid vehicle 20 of the embodiment provides the display indicating that the motor MG3 gives an assist to the directly transmitted torque Ted of the engine 22, on the display device 89. According to a modification, such a display may not be provided on the display device 89. According to another modification, this situation may be notified by audio output from a speaker (not shown), in place of or in addition of the display on the display device 89.

Figure 4:
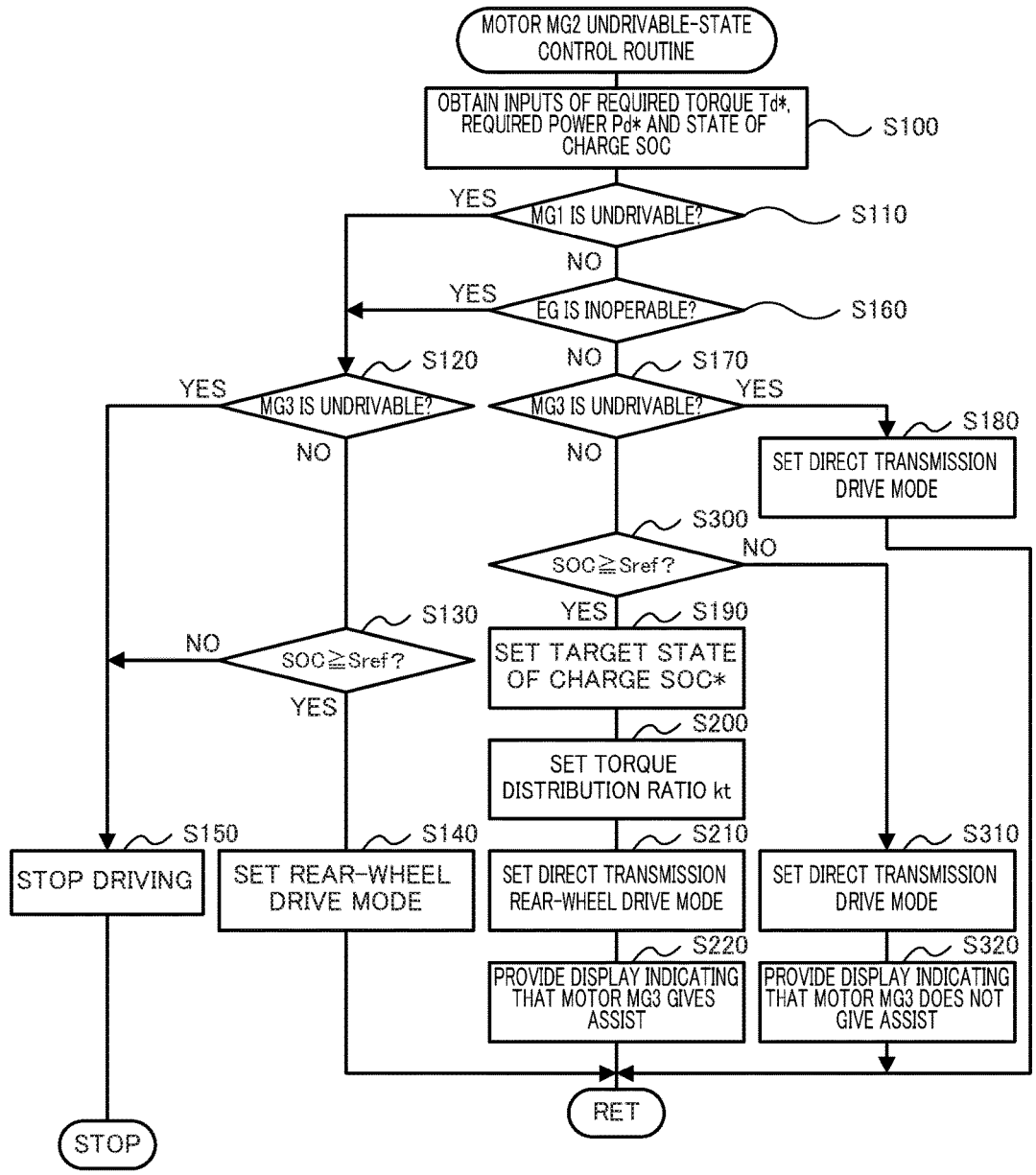
FIG. 4 is a flowchart showing another example of the motor MG2 undrivable-state control routine.
Figure 5:
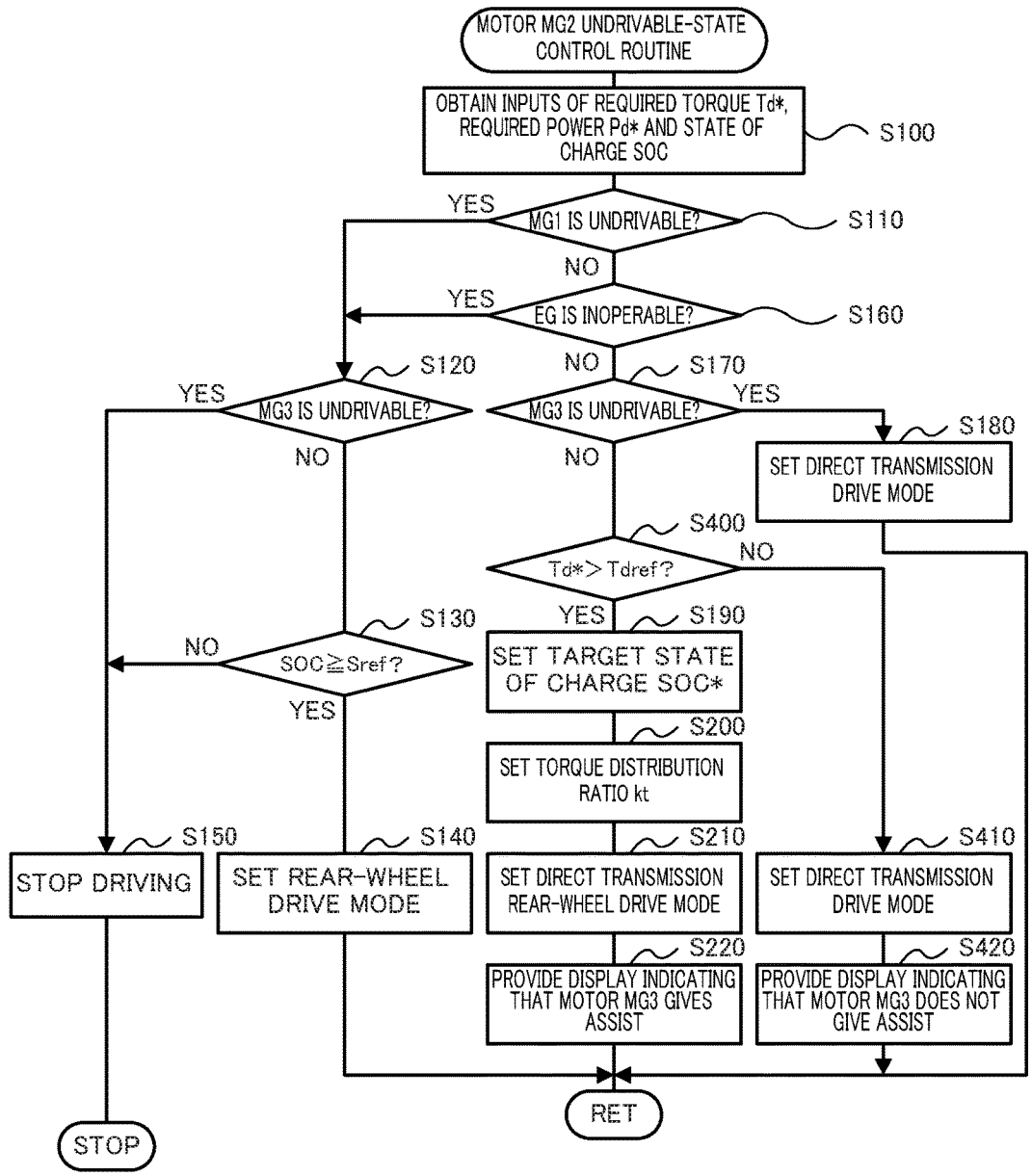
FIG. 5 is a flowchart showing another example of the motor MG2 undrivable-state control routine.

When the motor MG2 is undrivable but the engine 22 is operable and the motors MG1 and MG3 are drivable, the hybrid vehicle 20 of the embodiment sets the direct transmission rear-wheel drive mode. According to a modification, either the direct transmission rear-wheel drive mode or the direct transmission drive mode may be set according to the state of charge SOC of the battery 50 or according to the required torque Td*. FIG. 4 shows one example of the motor MG2 undrivable-state control routine when either the direct transmission rear-wheel drive mode or the direct transmission drive mode is set according to the state of charge SOC of the battery 50. FIG. 5 shows one example of the motor MG2 undrivable-state control routine when either the direct transmission rear-wheel drive mode or the direct transmission drive mode is set according to the required torque Td*.

The motor MG2 undrivable-state control routine of FIG. 4 is described below. The motor MG2 undrivable-state control routine of FIG. 4 is similar to the motor MG2 undrivable-state control routine of FIG. 2, except addition of the processing of steps S300 to S320. The like processing is expressed by the like step number and is not described in detail.

In the motor MG2 undrivable-state control routine of FIG. 4, when the engine 22 is operable and the motors MG1 and MG3 are drivable (steps S110, S160 and S170), the HVECU 70 compares the state of charge SOC of the battery 50 with the reference value Sref (step S300), like the processing of step S130 described above. When the state of charge SOC of the battery 50 is equal to or higher than the reference value Sref, the HVECU 70 performs the processing of steps S190 to S220 and terminates this routine.

When it is determined at step S300 that the state of charge SOC of the battery 50 is lower than the reference value Sref, the HVECU 70 sets the direct transmission drive mode (step S310), like the processing of step S180 described above. The HVECU 70 then provides a display indicating that the motor MG3 does not give an assist to the directly transmitted torque Ted of the engine 22 (i.e., indicating that the motor MG3 is not driven), on the display device 89 (step S320) and terminates this routine. Driving the hybrid vehicle with only the directly transmitted torque Ted of the engine 22 corresponds to setting the torque distribution ratio kt to a value "0" (i.e., setting the power consumption of the motor MG3 to a value "0"). Accordingly the configuration that causes the hybrid vehicle to be driven with only the directly transmitted torque Ted of the engine 22 further suppresses the battery 50 from being over-discharged, compared with the configuration that causes the hybrid vehicle to be driven with the directly transmitted torque Ted of the engine 22 and the torque output from the motor MG3. This configuration provides the display indicating that the motor MG3 does not give an assist to the directly transmitted torque Ted of the engine 22, on the display device 89. This configuration accordingly enables the driver to be notified of and recognize the situation.

The motor MG2 undrivable-state control routine of FIG. 5 is described below. The motor MG2 undrivable-state control routine of FIG. 5 is similar to the motor MG2 undrivable-state control routine of FIG. 2, except addition of the processing of steps S400 to S420. The like processing is expressed by the like step number and is not described in detail.

In the motor MG2 undrivable-state control routine of FIG. 5, when the engine 22 is operable and the motors MG1 and MG3 are drivable (steps S110, S160 and S170), the HVECU 70 compares the required torque Td* with a reference value Tdref (step S400). The reference value Tdref may be, for example, an upper limit directly transmitted torque that is an upper limit of the directly transmitted torque Ted of the engine 22 or may be a slightly smaller torque than the upper limit directly transmitted torque. The upper limit directly transmitted torque may be determined, based on the allowable driving ranges of the engine 22 and the motor MG1.

When it is determined at step S400 that the required torque Td* is equal to or smaller than the reference value Tdref, the HVECU 70 sets the direct transmission drive mode (step S410), like the processing of step S180 described above. The HVECU 70 then provides a display indicating that the motor MG3 does not give an assist to the directly transmitted torque Ted of the engine 22 (i.e., indicating that the motor MG3 is not driven), on the display device 89 (step S420) and terminates this routine. This reduces the opportunity that the motor MG3 is driven.

When it is determined at step S400 that the required torque Td* is larger than the reference value Tdref, on the other hand, the HVECU 70 sets the predetermined value S2 to the target state of charge SOC* of the battery 50 (step S190), sets the torque distribution ratio kt based on the state of charge SOC of the battery 50 (step S200) and sets the direct transmission rear-wheel drive mode (step S210). The HVECU 70 then provides a display indicating that the motor MG3 gives an assist to the directly transmitted torque Te of the engine 22 (i.e., indicating that the motor MG3 is driven), on the display device 89 (step S220) and terminates this routine. This configuration enables the hybrid vehicle to more sufficiently respond to the required torque Td*, compared with the configuration that drives the hybrid vehicle in the direct transmission drive mode.

In the motor MG2 undrivable-state control routine of FIG. 4 or FIG. 5, when the motor MG2 is undrivable but the engine 22 is operable and the motors MG1 and MG3 are drivable, the hybrid vehicle of this modification provides both the display indicating that the motor MG3 gives an assist to the directly transmitted torque Ted of the engine 22 and the display indicating that the motor MG3 does not give an assist to the directly transmitted torque Ted of the engine 22, on the display device 89. This configuration reduces the driver's feeling of strangeness on the occasion of a changeover between the state that the motor MG3 gives an assist to the directly transmitted torque Ted of the engine 22 and the state that the motor MG3 does not give an assist to the directly transmitted torque Ted of the engine 22.

In the motor MG2 undrivable-state control routine of FIG. 4 or FIG. 5, when the motor MG2 is undrivable but the engine 22 is operable and the motors MG1 and MG3 are drivable, the hybrid vehicle of this modification sets either the direct transmission rear-wheel drive mode or the direct transmission drive mode according to the state of charge SOC of the battery 50 or according to the required torque Td*. According to another modification, either the direct transmission rear-wheel drive mode or the direct transmission drive mode may be set according to both the state of charge SOC of the battery 50 and the required torque Td*. In this modification, the direct transmission rear-wheel drive mode may be set when the state of charge SOC of the battery 50 is equal to or higher than the reference value Sref and the required torque Td* is larger than the reference value Tdref. The direct transmission drive mode may be set when the state of charge SOC of the battery 50 is lower than the reference value Sref or when the required torque Td* is equal to or smaller than the reference value Tdref.

In the motor MG2 undrivable-state control routine of FIG. 4 or FIG. 5, when the motor MG2 is undrivable but the engine 22 is operable and the motors MG1 and MG3 are drivable, the hybrid vehicle of this modification provides both the display indicating that the motor MG3 gives an assist to the directly transmitted torque Ted of the engine 22 and the display indicating that the motor MG3 does not give an assist to the directly transmitted torque Ted of the engine 22, on the display device 89. According to another modification, the hybrid vehicle may be configured to provide either one of the display indicating that the motor MG3 gives an assist to the directly transmitted torque Ted of the engine 22 and the display indicating that the motor MG3 does not give an assist to the directly transmitted torque Ted of the engine 22, on the display device 89. According to another modification, the hybrid vehicle may be configured to provide neither the display indicating that the motor MG3 gives an assist to the directly transmitted torque Ted of the engine 22 nor the display indicating that the motor MG3 does not give an assist to the directly transmitted torque Ted of the engine 22, on the display device 89. According to another modification, both of these situations may be notified by audio output from a speaker (not shown), in place of or in addition of the display on the display device 89.

The hybrid vehicle 20 of the embodiment is configured to include the engine ECU 24, the motor ECU 40 and the HVECU 70. According to a modification, the engine ECU 24, the motor ECU 40 and the HVECU 700 may be configured by a single electronic control unit.

The hybrid vehicle 20 of the embodiment is configured such that the engine 22 and the motor MG1 are connected via the planetary gear 30 with the driveshaft 36F coupled with the front wheels 39a and 39b, that the motor MG2 is connected with the driveshaft 36F, and that the motor MG3 is connected with the driveshaft 36R coupled with the rear wheels 39c and 39d. According to a modification, the hybrid vehicle may be configured such that the engine 22 and the motor MG1 are connected via the planetary gear 30 with the driveshaft 36R, that the motor MG2 is connected with the driveshaft 36R, and that the motor MG3 is connected with the driveshaft 36F.

In the hybrid vehicle of the above aspect, when the second motor is undrivable, the control device may be configured to control the engine, the first motor and the third motor, such as to provide a higher ratio of a torque output to the other pair of wheels to a sum of a torque output to the one pair of wheels and the torque output to the other pair of wheels at a higher state of charge of the battery, compared with a ratio provided at a lower state of charge of the battery. When the battery has a high state of charge, a higher torque distribution ratio may be provided to increase the power consumption of the third motor and suppress the battery from being overcharged. When the battery has a low state of charge, on the other hand, a lower torque distribution ratio may be provided to decrease the power consumption of the third motor and suppress the battery from being over-discharged.

Also, in the hybrid vehicle of the above aspect, when the second motor is undrivable and the third motor is driven, the control device may be configured to notify a driver that the third motor is driven. This configuration enables the driver to recognize that the third motor is driven when the second motor is undrivable.

Additionally, in the hybrid vehicle of the above aspect, the control device may be configured not to drive the third motor when the second motor is undrivable and the state of charge of the battery is lower than a predetermined state of charge. This configuration suppresses the battery from being overdischarged.

Additionally, in the hybrid vehicle of the above aspect, when the second motor is undrivable and the required torque is equal to or smaller than a predetermined torque, the control device may be configured not to drive the third motor. This configuration reduces the opportunity that the third motor is driven. The "predetermined torque" may be, for example, an upper limit of the torque that is allowed to be output from the engine via the planetary gear to the one pair of wheels.

In the hybrid vehicle of the above aspect configured not to drive the third motor when the second motor is undrivable and the state of charge of the battery is lower than the predetermined state of charge or the required torque is equal to or smaller than the predetermined torque, when the second motor is undrivable and the third motor is not driven, the control device may be configured to notify a driver that the third motor is not driven. This configuration enables the driver to recognize that the third motor is not driven when the second motor is undrivable.

The following describes the correspondence relationship between the primary components of the embodiment and the primary components of the disclosure described in Summary. The engine 22 of the embodiment corresponds to the "engine"; the motor MG1 corresponds to the "first motor"; the planetary gear 30 corresponds to the "planetary gear"; the motor MG2 corresponds to the "second motor"; the motor MG3 corresponds to the "third motor"; and the battery 50 corresponds to the "battery"; the HVECU 70, the engine 40 and the motor ECU correspond to the "controller".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The disclosure is applicable to, for example, the manufacturing industries of hybrid vehicles.

What is claimed is:

1. A hybrid vehicle, comprising:
an engine;
a first motor;
a planetary gear configured to include three rotational elements that are respectively connected with one of a front pair of wheels or a rear pair of wheels, the engine and the first motor, such that the first motor, the engine and the one pair of wheels are arrayed in this sequence in a collinear diagram;
a second motor connected with the one pair of wheels;
a third motor connected with the other of the front pair of wheels or the rear pair of wheels;
a battery configured to transmit electric power to and from the first motor, the second motor and the third motor; and
a control device configured to control the engine, the first motor, the second motor and the third motor such that the hybrid vehicle is driven based on a required torque for driving, wherein
when the second motor is undrivable, the control device is configured to control the engine, the first motor and the third motor, such as to provide a higher state of charge of the battery than a state of charge of the battery provided when the second motor is drivable and such as to output a torque from the engine via the planetary gear to the one pair of wheels accompanied with output of a torque from the first motor and output a torque from the third motor to the other pair of wheels.

2. The hybrid vehicle according to claim 1,
wherein when the second motor is undrivable, the control device is configured to control the engine, the first motor and the third motor, such as to provide a higher ratio of a torque output to the other pair of wheels to a sum of a torque output to the one pair of wheels and the torque output to the other pair of wheels at a higher state of charge of the battery, compared with a ratio provided at a lower state of charge of the battery.

3. The hybrid vehicle according to claim 1,
wherein when the second motor is undrivable and the third motor is driven, the control device is configured to notify a driver that the third motor is driven.

4. The hybrid vehicle according to claim 1,
wherein when the second motor is undrivable and the state of charge of the battery is lower than a predetermined state of charge, the control device is configured not to drive the third motor.

5. The hybrid vehicle according to claim 4,
wherein when the second motor is undrivable and the third motor is not driven, the control device is configured to notify a driver that the third motor is not driven.

6. The hybrid vehicle according to claim 1,
wherein when the second motor is undrivable and the required torque is equal to or smaller than a predetermined torque, the control device is configured not to drive the third motor.

7. The hybrid vehicle according to claim 6,
wherein when the second motor is undrivable and the third motor is not driven, the control device is configured to notify a driver that the third motor is not driven.

* * * * *